(12) United States Patent
Hong

(10) Patent No.: US 9,440,568 B2
(45) Date of Patent: Sep. 13, 2016

(54) SEAT FOR VEHICLE

(71) Applicants: Hyundai Motor Company, Seoul (KR); Kia Motors Corp., Seoul (KR)

(72) Inventor: Sung Hak Hong, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 118 days.

(21) Appl. No.: 14/078,101

(22) Filed: Nov. 12, 2013

(65) Prior Publication Data

US 2015/0015053 A1  Jan. 15, 2015

(30) Foreign Application Priority Data

Jul. 11, 2013 (KR) .................. 10-2013-0081631

(51) Int. Cl.
*B60N 2/58* (2006.01)
*B60N 2/70* (2006.01)
*B60N 2/60* (2006.01)

(52) U.S. Cl.
CPC ........... *B60N 2/5825* (2013.01); *B60N 2/6009* (2013.01); *B60N 2/7011* (2013.01)

(58) Field of Classification Search
CPC B60N 2/5825; B60N 2/7011; B60N 2/6009; A47C 7/282
USPC ....................................... 297/216.14, 452.56
See application file for complete search history.

(56) References Cited

U.S. PATENT DOCUMENTS

| | | | | |
|---|---|---|---|---|
| 4,789,201 A | * | 12/1988 | Selbert | 297/218.1 |
| 4,869,554 A | * | 9/1989 | Abu-Isa | B60N 2/7011 |
| | | | | 297/448.2 |
| 5,882,073 A | * | 3/1999 | Burchi | B29C 44/1257 |
| | | | | 297/218.2 |
| 5,954,395 A | * | 9/1999 | Moulins et al. | 297/218.4 |
| 6,106,071 A | * | 8/2000 | Aebischer | B60N 2/2251 |
| | | | | 297/452.18 |
| 6,231,125 B1 | * | 5/2001 | Maeda | A47C 7/282 |
| | | | | 297/452.55 |
| 7,222,915 B2 | * | 5/2007 | Philippot et al. | 297/216.13 |
| 7,401,852 B2 | * | 7/2008 | Humer et al. | 297/216.13 |
| 7,703,855 B1 | * | 4/2010 | Kalinowski | 297/452.6 |

FOREIGN PATENT DOCUMENTS

| | | |
|---|---|---|
| JP | 2006-218153 A | 8/2008 |
| JP | 2010-75273 A | 4/2010 |
| JP | 2013-56612 A | 3/2013 |
| KR | 10-2009-0010799 A | 1/2009 |
| WO | WO 2012/020697 A1 | 2/2012 |

* cited by examiner

*Primary Examiner* — David R Dunn
*Assistant Examiner* — Tania Abraham
(74) *Attorney, Agent, or Firm* — Morgan, Lewis & Bockius LLP

(57) ABSTRACT

A vehicle seat includes: a seat back pad of a vehicle; a rear cover coupled with the seat back pad on the rear side and made of flexible material; and a bracket formed along the periphery of the rear cover, the bracket being coupled with the seat back pad so that its front is supported by the seat back pad.

9 Claims, 7 Drawing Sheets

SEAT FOR VEHICLE

CROSS REFERENCE TO RELATED APPLICATION

The present application claims priority of Korean Patent Application Number 10-2013-0081631 filed Jul. 11, 2013, the entire contents of which application is incorporated herein for all purposes by this reference.

BACKGROUND OF INVENTION

1. Field of Invention

The present invention relates to a vehicle seat provided in a vehicle on which a passenger sits.

2. Description of Related Art

Typically, a vehicle seat consists of a foam pad formed by foam molding, and a cover covering the outside of the foam pad. Further, a back cover having an integrated pocket, which is made of rigid plastic material or is a cover trim, covers the rear of the seat back with pocket to hold objects or the like. With this configuration, the finished portion results in a hard feeling, rattling occurs, and a comfortable feeling is gone, thereby making it less marketable.

In particular, passengers sitting on backseats complain the different feelings between the foam pad and the plastic material which is hard, when their knees or legs touch the cover of the seat back or they touch the back cover by hands.

In this regard, Japanese Patent Laid-Open Publication No. 10-2010-75273 discloses manufacturing a back cover of a seat with more flexible material. However, the manufacturing process requires use of an adhesive so that an unpleasant smell lasts inside a vehicle even after a long period of time has elapsed, thereby causing an unpleasant feeling for passengers and environmental contamination.

Accordingly, required is a vehicle seat using a back cover that provides passengers with soft touch feelings and is visually luxurious so as to increase marketability, without using any adhesive so as not to contaminate indoor air.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a vehicle seat using a back cover that provides passengers with soft touch feelings and is visually luxurious so as to increase marketability, without using any adhesive so as not to contaminate indoor air.

Various aspects of the present invention provide for a vehicle seat including: a seat back pad of a vehicle; a rear cover coupled with the seat back pad on the rear side and made of flexible material; and a bracket formed along the periphery of the rear cover, the bracket being coupled with the seat back pad so that its front is supported by the seat back pad.

The seat back pad may have on its back a rearward facing recessed groove so that the seat back pad has an opening of predetermined size and shape in the middle, and the recessed groove may have on its back end a flange portion extending along the periphery of the opening toward the opening.

The seat back pad may have hook inside of the flange portion, and the bracket may have projections spaced apart at a regular distance along the periphery of the bracket, wherein the projections are hung on the hooks so that the bracket is coupled with the seat back pad on its rear side.

The projections of the bracket may project from the rear of the bracket toward the front, be bent downwardly to be extended, and again bent toward the rear to be extended, to reach the rear of the bracket.

Each of the projections may further include on its front a holding portion which is bent on the front of the projection upwardly or downwardly to be extended, wherein the holding portion has a fixing member separately formed and fixed thereto by which the bracket is coupled with the seat back pad on its back.

The fixing member may be a clip.

The projections of the bracket may project from the rear of the bracket toward the front, may be bent downwardly to be extended, and again bent toward the rear to be extended, to reach the rear of the bracket The rear cover may include non-woven fabric of polypropylene (PP) or polyethyleneterephthalate (PET), and be made of thermoplastic composites including glass fiber of 400 to 1700 GSM (grams per square meter).

The vehicle seat may further include an outer cover covering the rear cover and the bracket at the outermost side of the rear cover and the bracket, wherein the outer cover is coupled according to the edge folding technique in which the ends of the rear cover are bent inwardly of the outermost edges of the bracket to thereby cover the bracket.

The rear cover, the bracket and the outer cover may be integrally formed by press molding.

The present methods and apparatuses have other features and advantages apparent from the accompanying drawings, incorporated herein, and below Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
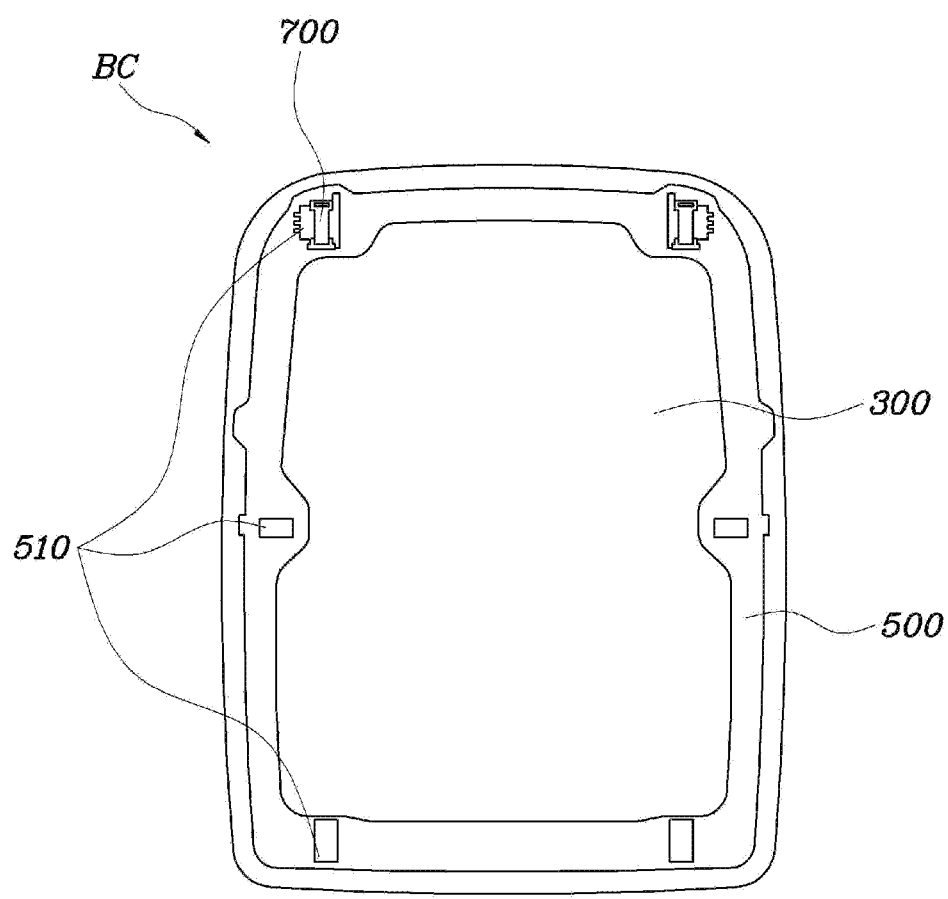
FIG. 1 is a diagram showing a back cover of an exemplary vehicle seat according to the present invention.
Figure 2:
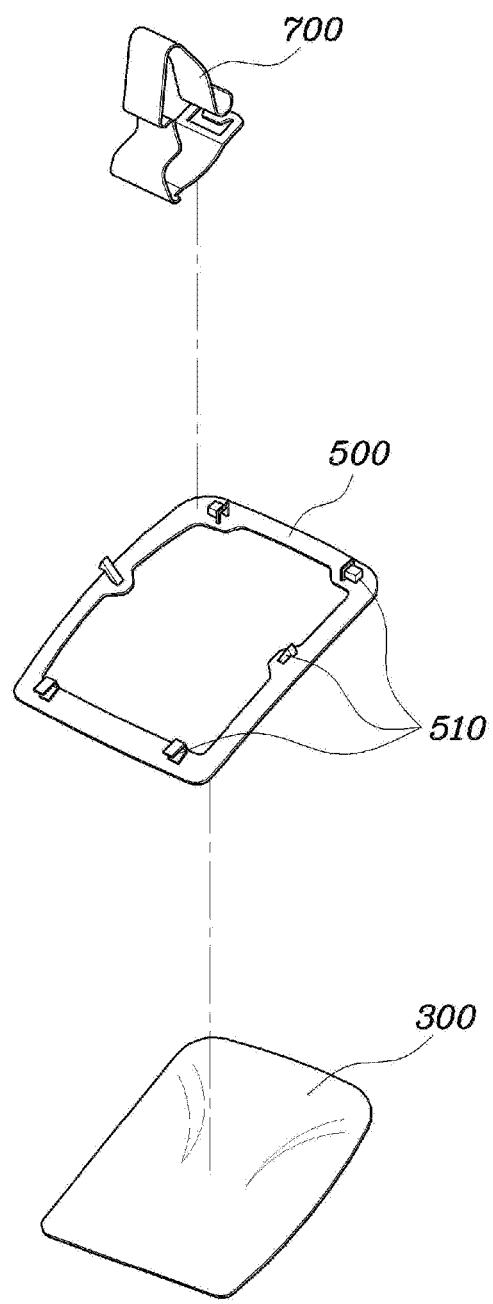
FIG. 2 is an exploded perspective view of the back cover shown in FIG. 1.
Figure 3:
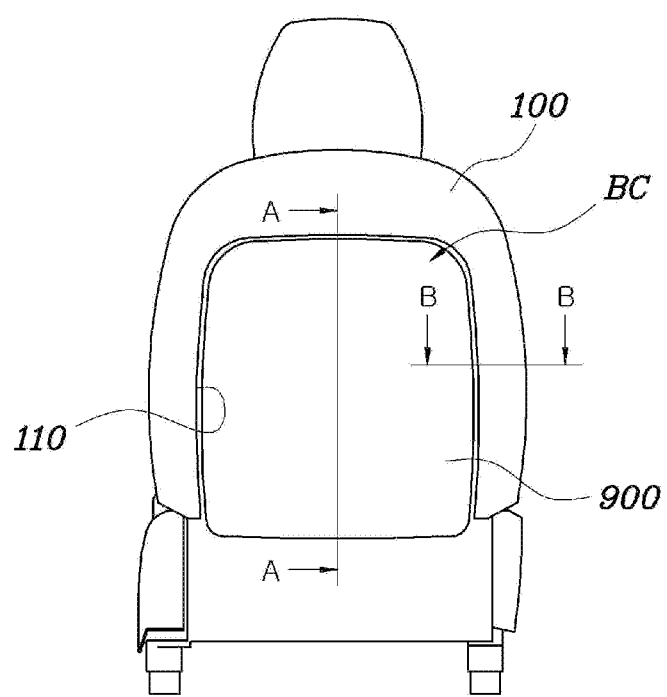
FIG. 3 is a diagram showing the back cover shown in FIG. 1 coupled with a seat back pad.
Figure 4:
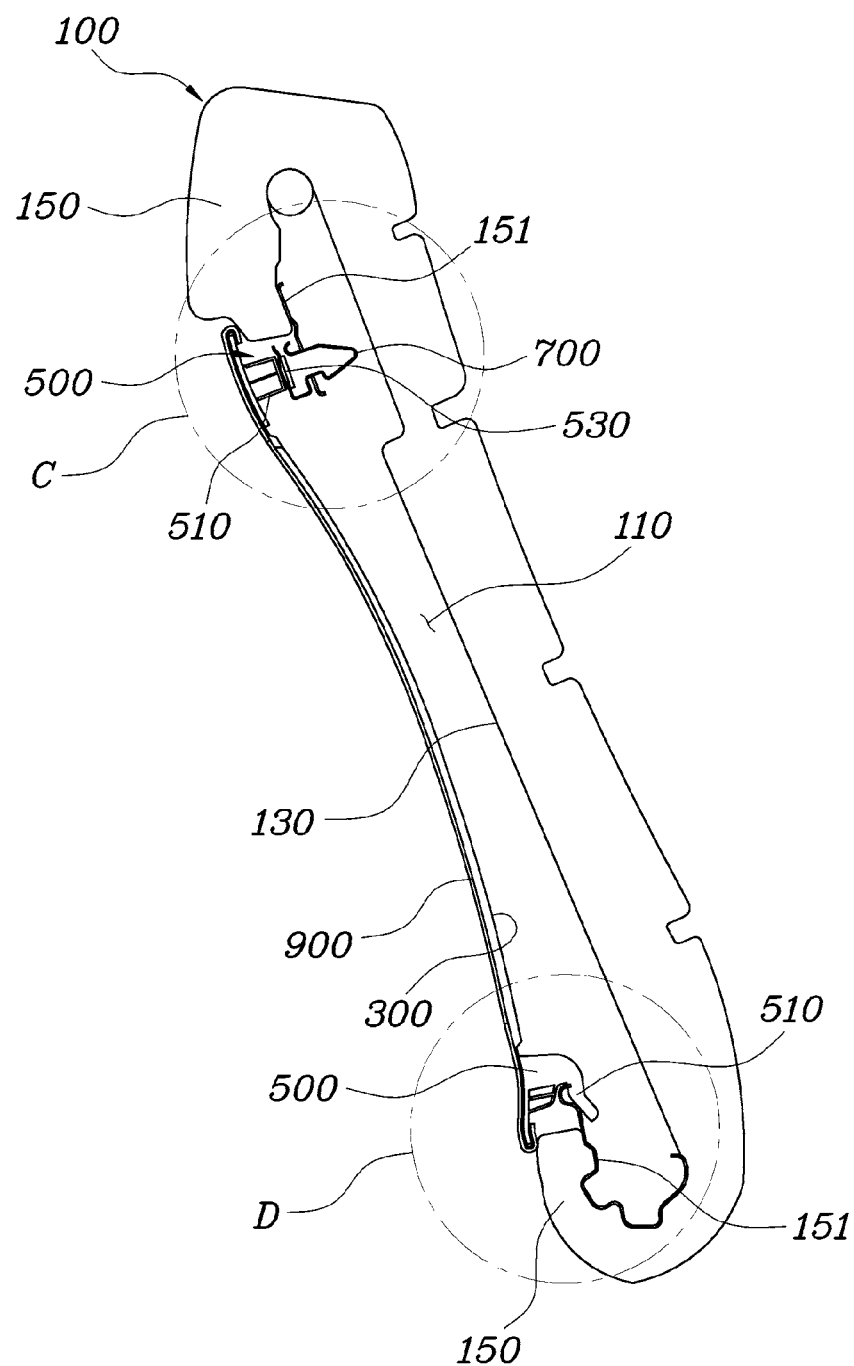
FIG. 4 is a cross-sectional view taken along line A-A of FIG. 3.
Figure 5:
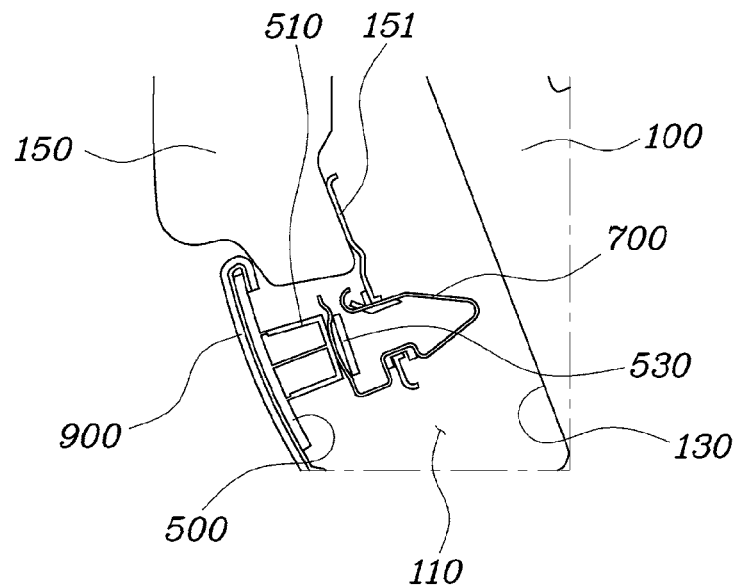
FIG. 5 is an enlarged view of C of FIG. 4.
Figure 6:
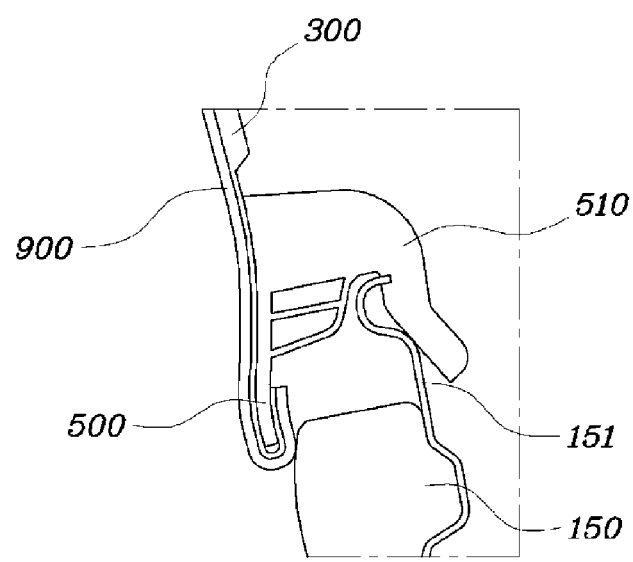
FIG. 6 is an enlarged view of D of FIG. 4.
Figure 7:
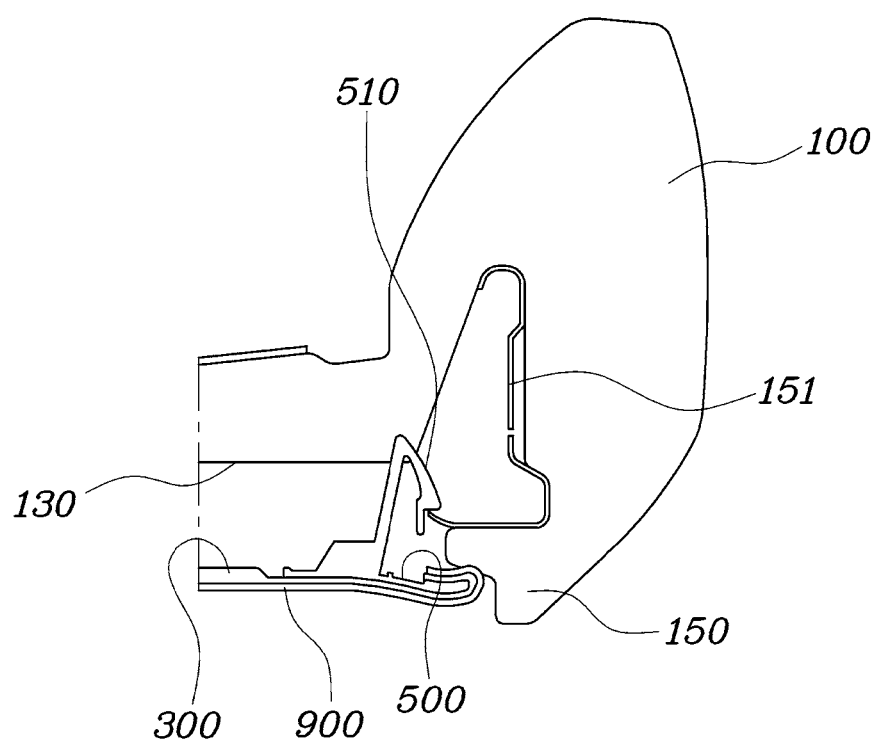
FIG. 7 is a cross-sectional view taken along line B-B of FIG. 3.
Figure 8:
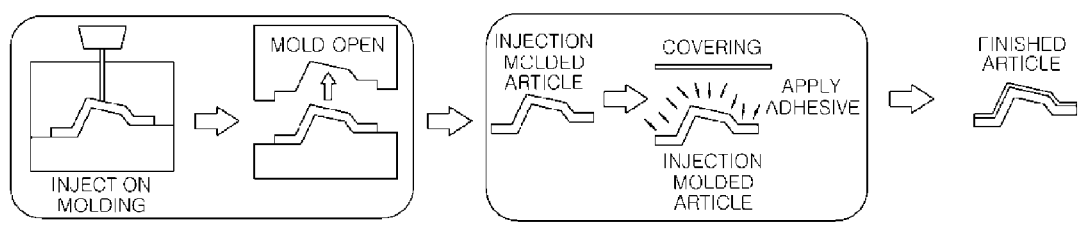
FIG. 8 is a diagram illustrating the process of molding a back cover according to a conventional method.
Figure 9:
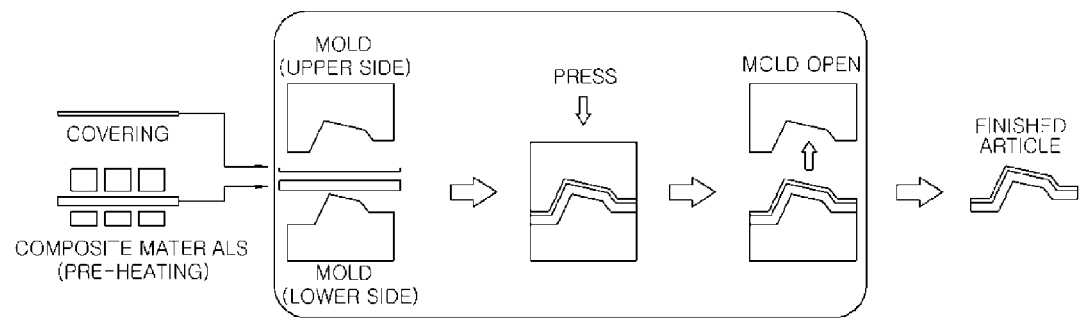
FIG. 9 is a diagram illustrating an exemplary process of molding a back cover of a seat for a vehicle according to the present invention.

FIG. 1 is a diagram showing a back cover B of a seat for a vehicle according to various embodiments of the present invention, FIG. 2 is an exploded perspective view of FIG. 1, and FIG. 3 is a diagram showing the back cover of FIG. 1 coupled with a seat back pad 100. FIG. 4 is a cross-sectional view taken along line A-A of FIG. 3, FIG. 5 is an enlarged view of C of FIG. 4, FIG. 6 is an enlarged view of D of FIG. 4, and FIG. 7 is a cross-sectional view taken along line B-B of FIG. 3. Further, FIG. 8 is a diagram illustrating the process of molding a back cover B according to the conventional method, whereas FIG. 9 is a diagram illustrating the process of molding a back cover B of a seat for a vehicle according to various embodiments of the present invention.

A vehicle seat according to various embodiments of the present invention includes a seat back pad 100; a rear cover 300 coupled with the seat back pad 100 on the rear side and formed with flexible material; and a bracket 500 formed along the perimeters of the rear cover 300 and having its front part supported by the seat back pad 100.

Typically, a vehicle seat is divided into a seat cushion on which a passenger sits and a seat back supporting the back of the passenger. Each of the seat cushion and the seat back includes a foam pad formed by foam molding and an outer cover covering the outside of the foam pad.

The present invention specifically relates to the rear of the seat back, and to a back cover BC attached on the rear of the seat back so as to provide a space for storing a passenger's objects. The back cover BC includes a rear cover 300, a bracket 500 by which the rear cover 300 is fixed, and an outer cover 900 covering the rear cover 300 from outside the rear cover 300.

The seat back pad 100 has on its rear surface a reward facing recessed groove 130 forming a void that extends toward the front of the seat back pad 100 so as to have an opening having predetermined size and shape at the center. Although the opening 110 is shown in the drawing to have a rectangular shape with rounded corners, which is the same or similar with the shape of the rear of the seat back pad 100, the shape and size may be varied depending on design.

In addition, at the rear end of the recessed groove 130 formed on the rear of the seat back pad 100, a flange portion 150 is formed which is extended inwardly of the opening 110 along the periphery of the opening 110 so that the opening 110 is narrowed. A hook 151 made of steel or the like is provided inside the flange portion 150.

Since the bracket 500 fixes the rear cover 300 of the back cover BC to the seat back pad 100, the size to support and fix the rear cover 300 to the seat back should be as small as possible.

In particular, the bracket 500 is formed along the outermost edges of the rear cover 300 and has through holes in the middle so that it reduces the weight thereof and provides passengers with a soft touch feeling. The outer cover 900 covering the rear cover 300 and the bracket 500 is coupled with the outermost side where the rear cover 300 and the bracket 500 are coupled with each other.

Here, in the outer cover 900, the edge folding technique is used in which the end portion of the rear cover 300 is folded into the flange portion 150 of the seat back pad 100 by bending a part of the edges of the bracket 500 inwardly of the outermost edges, such that the outer cover 900 and the rear cover 300 enclose the bracket 500. By doing so, the cut surfaces of each of the components are not exposed to the outside so that visibility is improved and strength is enhanced.

In addition, the rear cover 300, the bracket 500 and the outer cover 900 forming the back cover BC are integrally formed by low pressure press molding as shown in FIG. 9. Unlike the conventional method as shown in FIG. 8, this makes the process simpler and the weight lighter by forming the back cover in a manner that the rear cover 300, the bracket 500 and the outer cover 900, which are composite materials, are integrally molded in a single mold. Further, unlike the conventional method, adhesive is not used in the present invention such that the process is environmentally friendly.

Since the outer end of the bracket 500 is placed on the flange portion 150 of the seat back pad 100, projections 510 spaced apart at a regular distance along the periphery of the bracket 500 is formed on the front surface of the bracket 500. Accordingly, the projections 510 are hung on the hooks 151 of the seat back pad 100 so that the bracket 500 is supported on the rear surface of the seat back pad 100 more securely.

The projections 510 of the bracket 500 may be of the same shape and size or may have different shapes and sizes. Although, in various embodiments, the projection 510 positioned on the upper side of the bracket 500, the projection 510 positioned on the middle side of the bracket 500, the projection 510 positioned on the lower side of the bracket 500 have different shapes, the shapes of the projections may vary depending on design.

At first, the upper side projection 510 projects from the rear of the bracket 500 toward the front to be bent downwardly, and again bent toward the rear of the bracket 500 so as to reach the rear surface of the bracket 500. In some cases, a rib may be additionally formed therein so as to support the projection 510 more securely.

In addition, at the front of the projection 510, a holding portion 530 is additionally formed which is bent upwardly or downwardly from the front of the projection 510 to be extended, such that a separately formed fixing member 700 is held by the holding portion 530 to be fixed thereto, thereby more securely supporting the bracket 500 on the rear surface of the seat back pad 100. Various types of fixing member 700 may be used, and in the present invention a clip shown in FIG. 2 is used.

The lower side projection 510 of the bracket 500 projects from the rear surface of the bracket 500 toward the front and is bent downwardly so as to have a hook shape with an opened lower side. The hook shape of the lower side projection 510 is coupled with the hook 151 so that the bracket 500 is more securely fixed to the rear surface of the seat back pad 100.

As described above, the projections 510 are formed at the upper, middle and lower sides of the bracket 500. In order to increase the strength of the portion where the projection 510 is formed, the width of the bracket 500 may be larger than the portion where the projection 510 is not formed. The shape of the bracket 500 is shown in FIG. 1.

The rear cover 300 has a thickness between about 1.5 t and 5.5 t, includes non-woven fabric of polypropylene (PP) or polyethyleneterephthalate (PET) so that it feels better by touch to the passenger compared to the existing injection-molded plastic, and is formed with thermoplastic composites including glass fiber of 400 to 1700 GSM (grams per square meter).

A bracket 500 formed by injection molding with plastic material or steal material is coupled with the rear cover 300. A clip which is a fixing member 700 of steal material is fixed to the upper projection 510 of the bracket 500. Finally, an outer cover 900 made of fabric, artificial leather or leather material is coupled with the outermost side.

Accordingly, passengers can be provided with a softer touch feeling, an appropriate tension can be always maintained whether or not objects are stored in the space provided, and aesthetics can be improved to contribute to a luxurious feeling, thereby making it more marketable.

According to the vehicle seat configured as set forth above, passengers can be provide with soft touch feelings, an appropriate tension can always be maintained while a back cover can be persistently supported by a constant supporting force, and aesthetics can be improved to contribute luxurious feelings, thereby making it more marketable.

In addition, the rear cover, the bracket, and the outer cover, which are composite materials, are integrally molded in a single mold so that the process can be simplified, the weight thereof can be reduced, and no adhesive is used such that the process can be environmentally friendly.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle seat comprising:
    a seat back pad;
    a rear cover coupled with the seat back pad on a rear side of the seat back pad, the rear cover made of flexible material; and
    a bracket formed along a periphery of the rear cover, the bracket being coupled with the seat back pad so that a front of the bracket is supported by the seat back pad,
    an outer cover covering the rear cover and the bracket at an outermost side of the rear cover and the bracket,
    wherein the outer cover includes ends bent inwardly of outermost edges of the bracket and covering the outermost edges of the bracket to cover the bracket, and
    wherein the rear cover is made of thermoplastic composites including glass fiber.

2. The vehicle seat according to claim 1, wherein the seat back pad has a rearward facing recessed groove so that the seat back pad has an opening of predetermined size and shape in a middle thereof, and the recessed groove defines a flange portion extending along a periphery of the opening.

3. The vehicle seat according to claim 2, wherein the seat back pad has hooks inside of the flange portion, and the bracket has projections spaced apart at a regular distance along the periphery of the bracket, wherein the projections are hung on the hooks so that the bracket is coupled with the seat back pad on its rear side.

4. The vehicle seat according to claim 3, wherein the projections of the bracket project from the rear of the bracket toward the front, are bent downwardly to be extended, and again bent toward the rear to be extended, to reach the rear of the bracket.

5. The vehicle seat according to claim 4, wherein each of the projections further includes a forward holding portion which is bent on a front of the projection upwardly or downwardly to be extended, wherein the forward holding portion has a fixing member separately formed and fixed thereto by which the bracket is coupled with the seat back pad on its back.

6. The vehicle seat according to claim 5, wherein the fixing member is a clip.

7. The vehicle seat according to claim 3, wherein the projections of the bracket project from the rear of the bracket toward the front, and are bent downwardly to be hung on the hook.

8. The vehicle seat according to claim 1, wherein the rear cover, the bracket and the outer cover are integrally formed by press molding.

9. The vehicle seat according to claim 1, wherein the rear cover includes non-woven fabric of polypropylene (PP) or polyethyleneterephthalate (PET), and is made of the thermoplastic composites including glass fiber of 400 to 1700 GSM (grams per square meter).

* * * * *